United States Patent [19]

Hoag

[11] Patent Number: 4,757,514
[45] Date of Patent: Jul. 12, 1988

[54] WIRE ARRAY LIGHT POLARIZER FOR GAS LASER

[75] Inventor: Ethan D. Hoag, Boston, Mass.

[73] Assignee: Laser Corporation of America, Lowell, Mass.

[21] Appl. No.: 765,229

[22] Filed: Aug. 13, 1985

[51] Int. Cl.$^4$ ............................................. H01S 3/08
[52] U.S. Cl. ................................................... 372/106
[58] Field of Search .................... 372/106, 9; 350/370

[56] References Cited

U.S. PATENT DOCUMENTS 3,875,529 4/1975 Hintz ........................................ 372/9
4,024,466 5/1977 Cremosnik .......................... 372/106

FOREIGN PATENT DOCUMENTS 0211990 10/1985 Japan ................................... 372/106

OTHER PUBLICATIONS

Cambridge Physical Sciences, "Near Infrared Grid Polarisers", Apr. 1972.

Primary Examiner—Gene Wan
Attorney, Agent, or Firm—William W. Habelt

[57] ABSTRACT

Light generated in the optical resonator of a gas laser is polarized by disposing an array of fine, parallel, highly light reflective wires in the path of the light beam propagating in the resonator. The wires are cooled by conduction of heat to a heat sink or by causing gas to flow through the array. In one embodiment, the wire array is arranged to be rotated to enable the plane of polarization to be turned to any desired orientation. The difference in absorption by the wire array between two orthogonal components of the flux in the resonator need be only in the order of 1% to cause nearly complete linear polarization of the light emerging from the resonator. The parallel wires, preferably, are spaced so that they are situated at the peaks of the lower order modes in the resonator. In lieu of using fine wires, very fine parallel lines or grooves whose width and spacing are such as to provide a low efficiency diffraction grating may be provided in the surface of an optical element of the resonator.

5 Claims, 3 Drawing Sheets

WIRE ARRAY LIGHT POLARIZER FOR GAS LASER

This invention relates in general to the generation of polarized light by a laser. More particularly, the invention pertains to the provision of means in the resonator of a gas laser that causes polarization of the light generated by the laser.

BACKGROUND OF THE INVENTION

It is known that a polarization sensitive element situated in the resonator of a laser in the path of the generated light results in polarization of the light flux in the resonator and enables the laser to output a polarized beam of light. The difference in absorption between two orthogonally polarized components of the flux in the resonator need be only in the order of 1% to effect almost complete linear polarization of the laser's output beam. For example, a flat mirror disposed to have the light incident upon it at a 45° angle may, in some instances, be adequate to provide the requisite difference in absorption. In a compact laser of the flowing gas type which employs a folded optical resonator, the use of a 45° reflector is undesirable because of space limitations in the resonator, the need to avoid interference with the gas flow, and the relatively high cost of suitable reflectors. Further, the use of a 45° reflector makes it difficult to alter the plane of polarization where flexibility is needed to enable the plane of polarization of the laser's output beam to be easily changed. In lieu of that prior arrangement for polarizing the light generated by a gas laser, it is desired to employ a polarizing device that requires a minimum space in the resonator, is less costly than the 45° reflector arrangement, and permits easy alteration of the plane of polarization.

Objects Of The Invention

The principal object of the invention is to provide an inexpensive polarization device, for use in the optical resonator of a gas laser, which occupies a small amount of space in the resonator.

Another object of the invention is to provide a simple polarization device for use in the optical resonator of a gas laser which enables the plane of polarization of the laser generated light to be easily altered.

Yet another object of the invention is to provide a polarization device for use in the optical resonator of a flowing gas laser which can be situated in the gas flow path without adversely affecting the flow.

The Drawings

FIG. 1 schematically shows a stable optical resonator of the folded type employable in a gas laser.

FIG. 2 schematically depicts the internal structural arrangement of a gas laser of the transverse gas flow type.

FIG. 3 schematically depicts an embodiment of the invention for polarizing the light generated in a laser of the transverse gas flow type.

FIG. 4 schematically shows another embodiment of the invention in which heat is conducted along the wires to a heat sink.

FIG. 5 schematically shows an embodiment of the invention that enables rotation of the plane of polarization of the laser generated light.

FIG. 6 diagramatically shows the preferred disposition of the polarizing wires with respect to the peaks of modes in the resonator.

DETAILED DESCRIPTION OF EMBODIMENTS OF THE INVENTION

Figure 1:
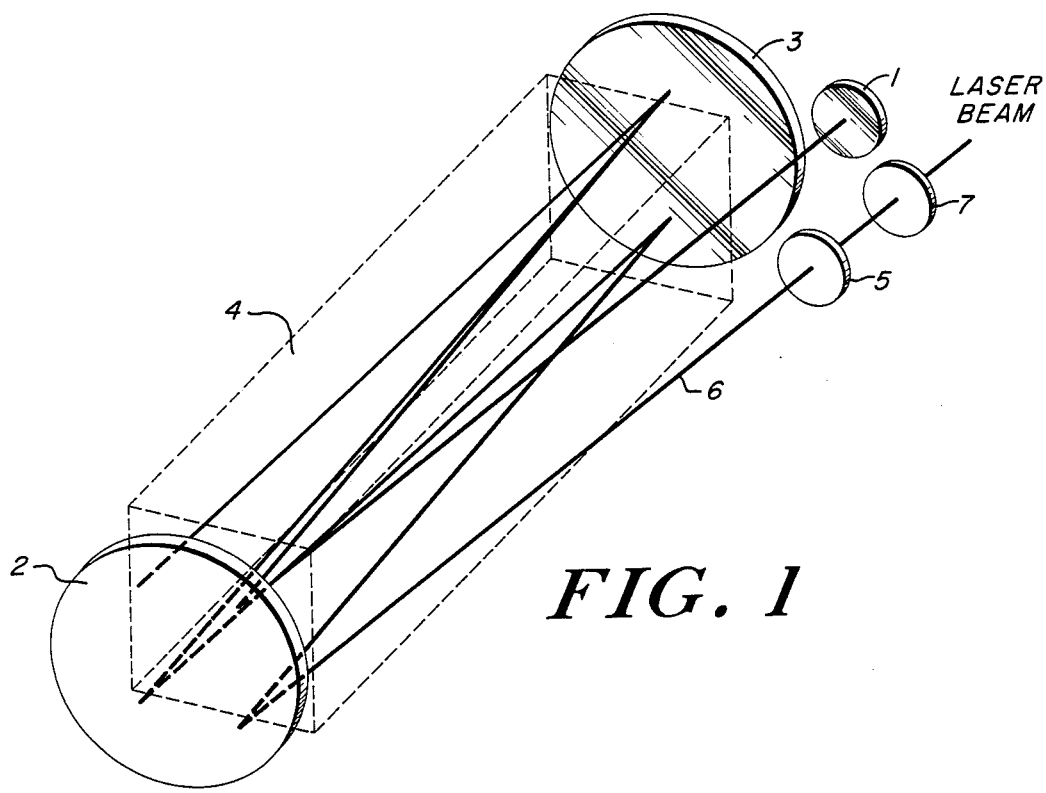

Referring now to FIG. 1, there is diagramatically shown a stable optical resonator of the folded kind employed in a flowing gas laser. In that kind of optical resonator, the length of the resonator is reduced by reflecting the light beam between mirrors situated at the ends of the resonator's cavity. Such a resonator is termed a "folded" resonator because the light beam is deemed to be folded between the two mirrors. The stable resonator shown in FIG. 1 employs a primary mirror 1 having a concave reflecting surface that directs light toward the flat reflecting surface of a folding mirror 2. Folding mirror 2 is situated adjacent one end of a lasing region 4 and faces another flat folding mirror 3 disposed adjacent the other end of the lasing region. Situated near the periphery of folding mirror 3 is a flat feedback mirror 5 that is partially transmissive and allows some of the incident light to pass through it and emerge as the laser's output beam while reflecting the rest of the light back to the folding mirror 2.

In the operation of the laser, a gaseous medium, such as a mixture of $CO_2$, $N_2$, and He, having a population inversion of energy states, is caused to flow through the lasing region 4. In that region, radiation is amplified by laser action. A ray of radiation 6 reflected from the primary mirror 1, for example, moves along the path indicated in FIG. 1 where it is reflected back and forth between the folding mirrors 2 and 3. At a point in its travel, the ray is reflected from folding mirror 2 toward the feedback mirror 5 where it either passes through to an output window 7 and emerges as output radiation in a laser beam or the ray is reflected back to folding mirror 2 and retraces its path back to the primary mirror where it is again reflected to travel the same path to the feedback mirror. The FIG. 1 optical arrangement is termed a "stable" resonator. The invention is applicable to other type of optical resonators which are employable in lasers, such as the "unstable" type of optical resonator.

Figure 2:
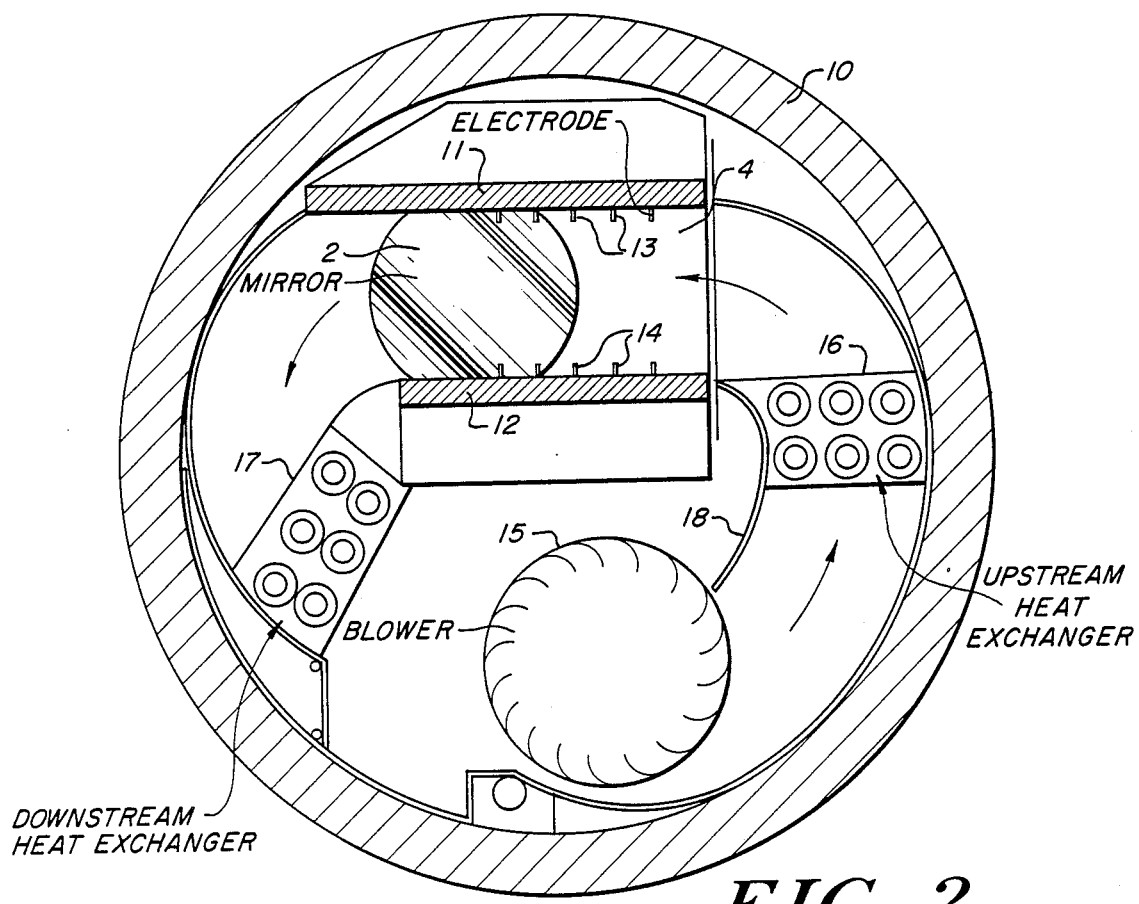

Referring now to FIG. 2 which schematically shows the structural arrangement inside a laser of the transverse gas flow type, the housing of the laser is formed by a cylindrical shell 10. For purposes of exposition, it is assumed that the stable optical resonator of FIG. 1 is employed in the depicted laser and, consequently, the folding mirror 2 is indicated in FIG. 2. The other optical elements of the stable resonator are omitted to provide an unobstructed view of the internal arrangement in the laser. The lasing region 4 is, in FIG. 2, situated between two dielectric plates 11 and 12 made of a material that can withstand high temperatures. Rows of electrodes 13 and 14 extend through the dielectric plates and establish an electric field that causes the gas flowing through the region 4 to lase. The gas is propelled through the lasing region by a blower 15. Before entering the lasing region, the gas passes through an upstream heat exchanger 16 that cools the gas to remove the heat added by the work of the blower. The hot gas leaving the lasing region then flows through a downstream heat exchanger 17 which cools the gas to restore the population of gas molecules to the appropriate levels for again permitting the stimulation of lasing by the gas. The gas flows in a closed path indicated by the arrows in FIG. 2. The gas flow is confined to the closed path by flow directing baffles 18. FIG. 2 exemplifies one structural arrangement of a transverse gas flow laser. Other structural arrangements employed in transverse gas flow lasers are disclosed in U.S. Pat. Nos. 3,721,915 and 3,748,594.

Figure 3:
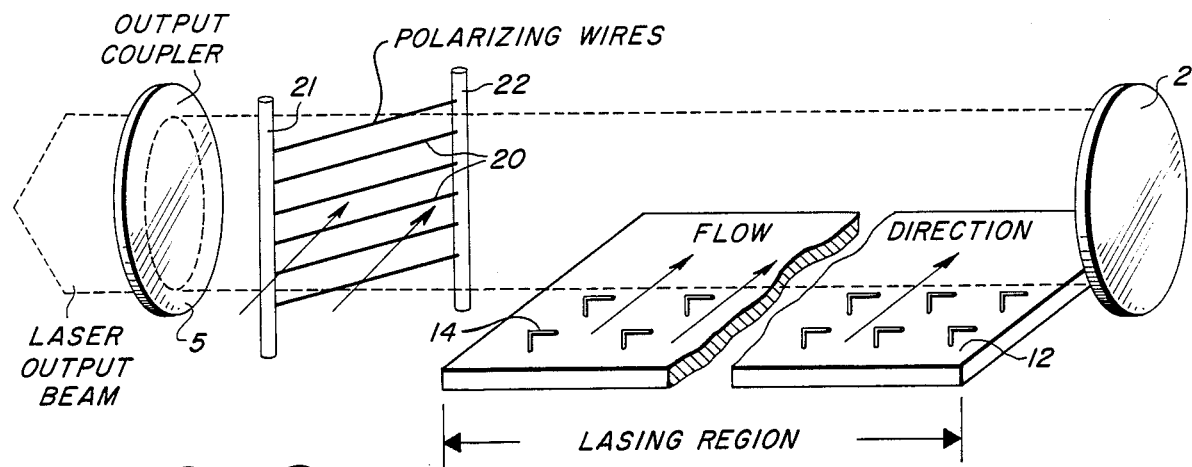

Referring now to FIG. 3 there is schematically shown only that portion of the stable optical resonator which has the feedback mirror 5 and the folding mirror 2. In FIG. 3 the transverse direction of gas flow is indicated by arrows in relation to the the light beam indicated by broken lines. Inasmuch as the mirror 5 couples the beam generated in the resonator out to the output window 7 of the laser, the mirror 5 will hereafter be termed the "output coupler". Disposed in the resonator in front of output coupler 5 is a parallel array of fine wires 20 suspended between posts 21 and 22. The wires are highly light reflective and are made of a highly electrically conductive material such as gold, silver, or copper.

It is known from scattering theory (see, for example, "Scattering Of Light And Other Electromagnetic Radiation", M. Kerker, Academic Press, New York 1969) that the scattering cross-section of highly conductive slender rods or wires of the order of 10 wavelengths in diameter of the incident radiation is different for orthogonal planes of polarization. If the diameter of the slender rods or wires is small compared to $\sqrt{\lambda L}$ where $\lambda$ is the wavelength of the incident radiation and L is the path length between the primary mirror and the output coupler, the rods or wires have negligible effect on the laser mode.

The parallel array of fine wires 20 which is disposed in the path of the light beam in the resonator causes linear polarization of the light in the beam. In an embodiment of the invention, the wires were of copper plated with silver and were 0.008" in diameter. The 0.008" diameter is approximately 20 wavelengths of the incident radiation and had a discernable effect on the modes in the resonator.

Ideally the diameter of the wires in the parallel array would be of the order of one wavelength or less because such fine wires would scatter a minimum of energy out of the mode and yet present a large ratio between the parallel and perpendicular planes of polarization. However for wavelengths of the order of 10 microns (the order of the wavelength of light produced by a $CO_2$, $N_2$, He laser), wires of such fineness are difficult to deal with from the aspect of mechanical strength as well as from the thermal aspect.

Though highly electrically conductive, the wires of the array absorb a fraction of the laser flux incident upon them and that absorbed energy is converted into heat. It is, consequently, necessary to remove that heat to prevent a failure of the wires from sagging or melting. For cooling purposes, the array of parallel wires is diposed in the path of the gas flow but at the fringe of the lasing region. The flowing gas carries away heat from the wires. To improve the aspect of the wires presented to the flowing gas, the wire array may be turned at an angle to the direction of gas flow, as indicated in FIG. 3. The gas then flows through the wire array. In lieu of turning the array at an angle to the direction of flow, a deflector such as a curved vane can be employed to divert a part of the gas flow through the wire array.

Figure 4:
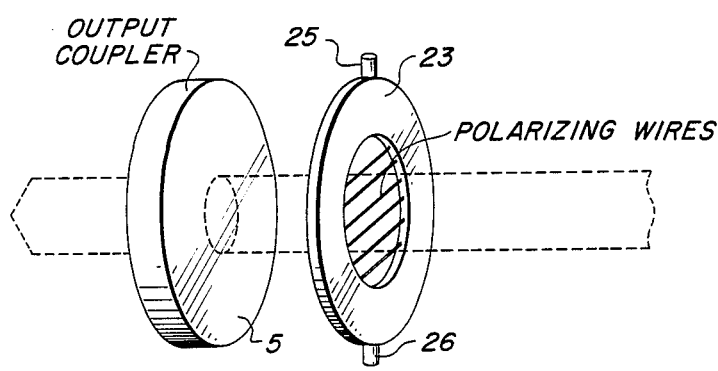

In addition to or in lieu of cooling by gas flow, the polarizing wires may, as shown in FIG. 4, be mounted in a carrier 23 having a central aperture for passage of the light beam to the output coupler 5. In that arrangement, the wire array is disposed in the plane that is normal to the direction of the light beam. The heat in the wires travels by conduction to the carrier which acts as a heat sink. The carrier, preferably, is cooled by water and for that purpose the carrier shown in FIG. 4 is hollow and has a water inlet 25 and a water outlet 26 which allows cooling water to flow through the hollow carrier. It has been determined that with lasers capable of developing on the order of 1 kw of optical power, either cooling method is adequate, provided the reflectivity of the polarizing wires can be maintained at approximately 1%.

Figure 5:
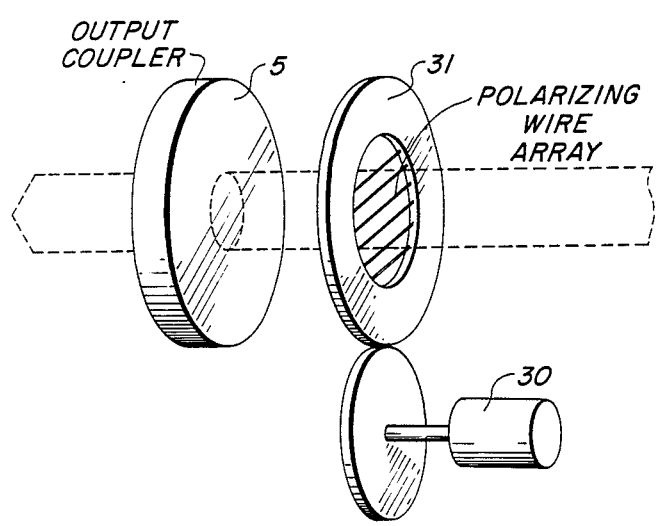

FIG. 5 schematically shows an embodiment which enables the plane of polarization of the light beam to be easily rotated. In that embodiment, an electric motor 30 is arranged to rotate the carrier 31 on which the array of polarizing wires is secured. By causing the shaft of the motor to turn, the carrier and its wire array are rotated. The plane of polarization, in the FIG. 5 embodiment, rotates with the rotation of the wire array. By using an electric motor that can be controlled externally of the laser housing, the plane of polarization can be changed without having to open the laser housing or shut down operation of the laser.

Figure 6:
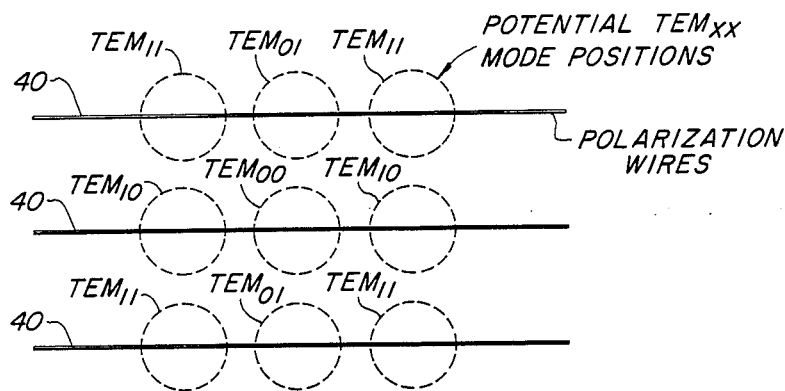

Influence Of The Polarizing Wires On The Modes In The Optical Resonator

Where the diameter of the polarizing wires is approximately 10 wavelengths or less of the radiation in the resonator, the polarizing wires have little or no effect upon the modes propagating on the optical resonator. In those instances where the diameter of the polarizing wires is larger than 20 wavelengths, the effect of the wires on the modes in the resonator can be significant. In the embodiment where the diameter of the wires is approximately 20 wavelengths, three parallel wires 40 are employed in the array, as indicated in FIG. 6. Indicated in that figure are the peaks of the $TEM_{00}$, $TEM_{01}$, $TEM_{10}$ and the $TEM_{11}$ modes. The polarization wires are positioned at the peaks of those modes. In those positions the wires scatter out approximately the same energy from each of those modes.

Embodiments Utilizing Mode Control Aperture

Figure 7:
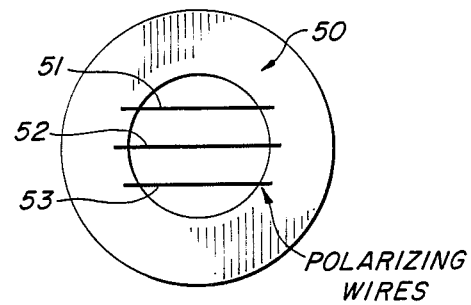
FIG. 7 shows an embodiment of the invention utilizing a mode control device for support of the array of polarizing wires.

To prevent higher order modes from forming in an optical resonator, a mode control device having a limiting aperture is employed. Such a mode control device 50 is shown in FIG. 7 positioned in the resonator in front of the output coupler 5. That mode control device is utilized in an embodiment of the invention to support the array of polarizing wires 51, 52, and 53. Those parallel wires, preferably, are spaced in the manner shown in FIG. 6.

Figure 8:
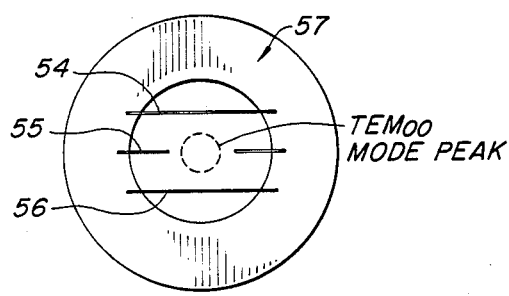
FIG. 8 shows a variation of the FIG. 7 which promotes the formation of the $TEM_{00}$ mode.

A variation on the FIG. 7 embodiment is shown in FIG. 8. In that variation, the middle section of the center wire 52 has been omitted. The omission of that middle section promotes the formation of the TEM$_{00}$ mode by reducing the loss of energy from that mode caused by the center polarizing wire. The wires 54, 55, and 56 in the FIG. 8 embodiment are spaced in the manner shown in FIG. 6. The gap in the wire 55 preferably is large enough so that essentially no scattering from the TEM mode occurs. In the FIGS. 7 and 8 embodiments, the mode control devices 50 and 57 also serve as heat sinks for the heat flowing by conduction along the polarizing wires.

Embodiment Utilizing Mirrors Of The Optical Resonator

Figure 9:
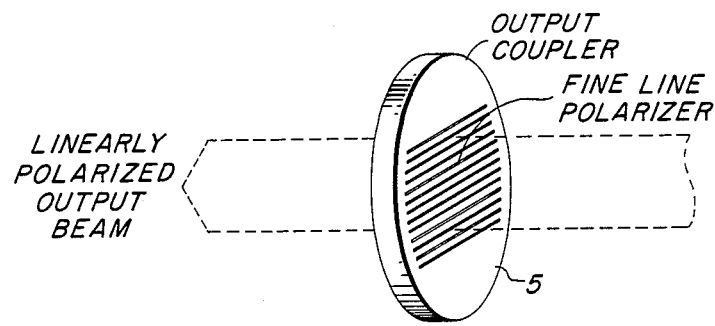
FIG. 9 depicts another embodiment of the invention in which the polarizing wire are replace by lines incised or etched in the surface of a mirror o the optical resonator.

The array of parallel fine wires can be situated virtually anywhere in the path of the beam in the optical resonator. The wire array would not, however, be placed in a region where it could not be adequately cooled. Inasmuch as some of the mirrors in the optical resonator having cooling provisions, the wire array may, be disposed on the surface of the mirror or embedded in that surface. For example, the wire array may, as indicated in FIG. 9, be disposed on the surface of the output coupler 5.

Instead of using fine wires, fine lines may be incised or etched in the surface of the mirror. Those fine lines or grooves also scatter radiation preferentially according to the direction of polarization. This embodiment has the advantage that very fine lines with a width of one wavelength or less can be produced in the mirror's surface. The width and spacing of such an array of fine lines is made such as to provide a very low efficiency diffraction grating which preferentially diffracts very low orders of energy (i.e. of the order of 1% or less of the mode flux) according to the orthogonal polarization planes. This embodiment operates like a mirror at 45° incidence in that it is insensitive to spacial details of the individual modes.

Inasmuch as the invention can be embodied in various forms, it is not intended that the scope of the invention be limited only to the embodiments here described. The invention, for example, can be embodied in gas lasers of the axial flow type as well as in lasers of the transverse flow type. It is intended, rather, that the scope of the invention be construed in accordance with the appended claims, having due regard for obvious changes that do not alter the essential features of the invention.

I claim:

1. An apparatus for polarizing the light generated in the optical resonator of a gas laser, comprising an annular carrier ring disposed in the resonator and having a central aperture for passage of the light beam therethrough, and an array of fine parallel highly light reflective wires mounted in said carrier ring so as to extend across the central aperture thereof in the path of the light beam, said annular carrier ring acting as a heat sink for carrying away heat from the wires.

2. An apparatus as recited in claim 1 further comprising means for rotating said annular carrier ring together with the wire array mounted therein.

3. An apparatus as recited in claim 1 further comprising a flow passage extending through the interior of said annular carrier ring, and means for passing a flow of cooling fluid through said flow passage thereby cooling the carrier ring.

4. An apparatus as recited in claim 1 wherein the array of fine parallel wires includes a center wire disposed to extend across a diameter of the central aperture of the carrier ring whereby the center wire extends along a line passing through the peak of the TEM$_{00}$ mode of the light beam.

5. An apparatus as recited in claim 4 wherein the center wire has a finite portion cut from its central region to provide a gap in the center wire; said gap being centrally located in the central aperture of said annular carrier ring and sized large enough so that essentially no scattering from the TEM$_{00}$ mode occurs.

* * * * *